US007688544B1

(12) United States Patent
Mallary et al.

(10) Patent No.: US 7,688,544 B1
(45) Date of Patent: Mar. 30, 2010

(54) MAGNETIC HEADS DISK DRIVES AND METHODS WITH FLOATING POLE TIP OR SHUNTED POLE TIP FOR REDUCED POLE TIP ERASURE

(75) Inventors: Michael Mallary, Sterling, MA (US); Mourad Benakli, Shrewsbury, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 762 days.

(21) Appl. No.: 11/438,452

(22) Filed: May 22, 2006

Related U.S. Application Data

(60) Provisional application No. 60/683,579, filed on May 23, 2005.

(51) Int. Cl.
*G11B 5/187* (2006.01)

(52) U.S. Cl. ........................... 360/125.06; 360/125.07; 360/125.3

(58) Field of Classification Search ............ 360/125.06, 360/125.07, 125.08, 125.3
See application file for complete search history.

(56) References Cited

U.S. PATENT DOCUMENTS 4,695,351 A 9/1987 Mallary
6,771,464 B2 * 8/2004 Minor ................... 360/125.12
6,791,796 B2 * 9/2004 Shukh et al. ........... 360/125.12
7,009,812 B2 * 3/2006 Hsu et al. .............. 360/125.12
7,426,092 B2 * 9/2008 Fukui et al. ............ 360/125.06
2002/0080524 A1 * 6/2002 Takahashi et al. ........... 360/126
2002/0109946 A1 * 8/2002 Sato et al. .................... 360/317
2004/0196589 A1 * 10/2004 Lille .......................... 360/125
2006/0245108 A1 * 11/2006 Hsu et al. ................... 360/125
2007/0019327 A1 * 1/2007 Maruyama et al. .......... 360/126
2008/0145524 A1 * 6/2008 Guthrie et al. .............. 427/131

OTHER PUBLICATIONS

Daniel Z. Bai and Jian-Gang Zhu, "A Detached Pole Tip Design of Perpendicular Write Heads for High Data-Rate Recording", IEEE Transactions on Magnetics, vol. 38, No. 5, Sep. 2002.

* cited by examiner

*Primary Examiner*—Jefferson Evans
(74) *Attorney, Agent, or Firm*—Mikel R. Boeve

(57) ABSTRACT

A write head includes a write return yoke, a write yoke connected to the write return yoke, conductive coils surrounding the write yoke, a write pole tip, and a non-magnetic spacer connecting the write pole tip to the write yoke. The non-magnetic spacer allows for reducing a magnetization of the write pole tip due to a remnant magnetic field in the write yoke. In another embodiment, the write head comprises a write shield, a write return yoke, a write yoke, conductive coils, a write pole tip, and a saturable yoke shunt connecting the write pole tip and the write shield. The saturable yoke shunt directs a limited amount of magnetic flux from the write pole tip to the write shield, such that when there is a remnant magnetic field in the write pole tip, the magnetic flux is directed to the write shield rather than to a disk.

24 Claims, 10 Drawing Sheets

MAGNETIC HEADS DISK DRIVES AND METHODS WITH FLOATING POLE TIP OR SHUNTED POLE TIP FOR REDUCED POLE TIP ERASURE

CROSS-REFERENCE TO RELATED PATENT APPLICATIONS

This application claims priority from U.S. Provisional Application Ser. No. 60/683,579, filed May 23, 2005, entitled "Reduced Pole Erase with Floating or Shunted Pole Tip", the contents of which are incorporated by reference herein.

BACKGROUND OF THE INVENTION

1. Field of the Invention

The present invention relates generally to disk drive write heads with pole tips that have reduced pole-tip erasure properties, and to methods of manufacturing such write heads.

2. Related Art

Disk drives are used in a wide variety of electronic devices, ranging from personal computers to portable media players, for the storage and retrieval of data. In a disk drive, data is typically written to and read from magnetic storage media called disks. A disk drive typically comprises a plurality of disks for the storage of data and one or more read/write heads for the reading and writing of data. There is a constant market demand to increase the data storage density of disks. Increasing the storage density of the disks can decrease the price to storage-capacity ratio of the disk drives, increase performance, and decrease the physical dimensions of the disk drive.

Traditionally, longitudinal recording has been used to record data on a disk drive. In longitudinal recording, the data bits are aligned parallel to the surface of the disk. Each bit is composed of a group of magnetic grains with magnetization aligned parallel to the disk surface; in a write operation, the write head flips the magnetization of the grains for each bit horizontally, parallel to the surface of the disk.

The write head typically comprises a pole tip, a yoke supporting the pole tip, and a conductive coil surrounding the yoke for electrically magnetizing the pole tip. During a write operation where the disk drive changes the storage state of a bit of data on the disk, the write head is moved to the location of the bit of data such that the pole tip is positioned directly above the bit, an electric current is passed through the coils to magnetize the pole tip, which in turn causes the magnetization of the bit to change.

In recent years, perpendicular recording has been introduced to achieve greater data storage density for disk drives. In perpendicular recording, the magnetization of each bit is aligned vertically, perpendicular to the disk surface. The write head flips the magnetization of the grains for each bit vertically, with either the north pole close to the surface or away from the surface. The perpendicular recording system allows more data bits per unit of disk surface area, which in turn enables greater data storage density for the disk drives.

A perpendicular recording system uses less disk surface area for each bit of data compared to a comparable longitudinal recording system. With the decease of surface area per bit of data, the dimensions of the pole tip of the write head must be reduced as well. A problem occurs when the magnetic state of the pole tip does not return to zero magnetization when the current in the conductive coils of the write head is stopped. This causes the pole tip to maintain some remnant magnetization field; and, as the write head moves across the disk, the pole tip can inadvertently change the magnetization state of other bits on the disk. This phenomenon is commonly known as pole tip erasure (PE) or pole tip lockup. Pole tip erasure (PE) can corrupt the data stored on the disk, and cause catastrophic failure for the disk drive.

There are several potential causes for the presence of remnant magnetic fields that cause pole tip erasure (PE) or pole tip lockup. One possible cause is the shape anisotropy of the pole tip. As the dimensions of the write pole tip decrease, the write pole tip becomes more similar in shape to a long-thin needle. The transverse self-demagnetizing field of the needle-like shape of the pole tip could potentially cause the magnetic domains of the pole tip to form into a lengthwise remnant magnetic state. That is, the magnetostatic energy is less when the magnetization is in the long axis of the needle compared to the short axis. Because it is easier to cause magnetization along the length direction of the tip compared to the transverse direction (hence the magnetic property is anisotropic), this shape anisotropy could potentially produce remnant magnetization in the pole tip even in the absence of an external field generated by the conductive coils.

Another possible cause of remnant magnetization in the pole tip is domain lockup of the yoke. The magnetization of the yoke may not immediately return to a zero-magnetization state after the current in the conductive coils is stopped; this in turn causes the pole tip to remain magnetized. A domain structure of the yoke with predominantly transverse magnetization will minimize domain lockup of the yoke. A domain structure with predominantly axial magnetization will enhance lockup of the yoke. Undesirable domain structures may be caused by axial magnetostriction anisotropy due to the interaction of the anisotropic stress field of the yoke with the magnetostriction of the yoke alloy.

In light of the problems discussed above, it is therefore preferable to have a write head design that eliminates or reduces the problem of pole tip lockup. Two methods of reducing the problem of remnant magnetization are proposed by Daniel Z. Bai and Jian-Gang Zhu, in "A Detached Pole Tip Design of Perpendicular Write Heads for High Data-Rate Recording", IEEE Transactions on Magnetics, Vol. 38, No. 5, September 2002. One method is the insertion of a 10 nm gap, parallel to the air bearing surface (ABS), between the pole tip and the yoke. The second method is the insertion of a lamination layer throughout the pole tip and yoke to act as an anti-ferromagnetic coupling (AFC) layer.

Both methods proposed by Bai and Zhu are extremely difficult to manufacture in a manufacturing production process. Typically, the write head is manufactured in a process where the layers are deposited in planes perpendicular to the air-bearing-surface (ABS). Thus, the insertion of a gap parallel to the air bearing surface (ABS) near the pole tip requires the insertion of a very narrow (10 nm) but relatively deep (500 nm) gap in the pole tip area. The insertion of a gap with such dimensions and aspect-ratio cannot be practically achieved in a manufacturing process using the current state-of-the-art manufacturing techniques. The lamination method proposed by Bai and Zhu requires the insertion of a very thin (7 Å) layer in the middle of the deposition of the write yoke and write pole tip. Such a process step is expensive, time-consuming, difficult to control, and incompatible with electroplating manufacturing processes.

Therefore, it is a goal of embodiments of the present invention to create a write pole tip with reduced or eliminated pole-tip erasure (PE) characteristics utilizing current manufacturing methods.

SUMMARY OF THE DISCLOSURE

Embodiments of the present invention relate generally to disk drive write heads with designs that minimize the effects of pole-tip erasure caused by remnant magnetic fields in the write yoke or the write pole tip.

A disk drive according to a general embodiment of the present invention comprises a write shield, a write return yoke connected to the write shield, a write yoke connected to the write return yoke, conductive coils surrounding the write yoke, a write pole tip, and a spacer connecting the write pole tip to the write yoke. The conductive coils surrounding the write yoke induce a magnetic field in the write yoke when an electric current passes through the conductive coils. The spacer connecting the write pole tip and the write yoke prevents a magnetization of the write pole tip when there is a small remnant magnetic field in the write yoke.

In various embodiments, the spacer is composed of a non-magnetic material. Hence, in such embodiments, the spacer acts as a non-magnetic gap between the magnetic write pole tip and write yoke. In some embodiments, the write shield, the write yoke, the write return yoke and the write pole tip are each composed of a soft ferromagnetic material.

In various embodiments, the material for the spacer is thermally conductive. In some embodiments, the spacer is composed of copper.

In various embodiments, the spacer is dimensioned such that the magnetic impedance between the pole tip and the write yoke is greater than 35% of the magnetic impedance between the pole tip and a soft underlayer of a disk of the disk drive, when the write head is positioned above the disk during a write operation.

In various embodiments, the spacer is oriented substantially perpendicular to an air-bearing-surface (ABS) of a disk of the disk drive when the write head is positioned above the disk during a write operation.

In various embodiments, the spacer is oriented substantially parallel to the length direction of the write pole tip.

In another general embodiment, a write head for a disk drive comprises a write shield, a write return yoke connected to the write shield, a write yoke connected to the write return yoke, conductive coils surrounding the write yoke for inducing a magnetic field in the write yoke, a write pole tip, and a shunt connecting the write pole tip to the write shield for providing a magnetic flux path between the write pole tip and the write shield.

In various embodiments, the shunt is composed of a low saturation magnetization (Ms) material.

In various embodiments, the shunt is capable of directing a limited amount of magnetic flux such that when the pole tip is at a low magnetization state, all magnetic flux from the pole tip is directed to the write shield via the shunt; and, when the pole tip is at a high magnetization state, the shunt becomes saturated and only a fixed amount of magnetic flux is directed from the pole tip to the write shield. In such embodiments, when there is a low remnant magnetic field in the write pole tip, the remnant magnetization is directed to the write shield via the shunt. However, when the magnetization in the write pole tip is high due to the magnetization caused by the conducting coils during a write operation, the shunt is saturated and most of the magnetic flux is directed from the write pole tip to the disk.

In various embodiments, the shunt is oriented substantially perpendicular to an air-bearing-surface (ABS) of a disk when the write head is positioned above the disk during a write operation. In other various embodiments, the shunt is oriented substantially parallel to the ABS during a write operation.

A method for manufacturing a write head according to an embodiment of the present invention comprises providing a first layer, depositing a write pole tip on a first portion of the first layer, depositing a first insulating layer on a second portion of the first layer, depositing a spacer layer on a first portion of the write pole tip, depositing a second insulating layer on a second portion of the write pole tip, depositing a write yoke on at least a portion of the spacer layer and on at least a portion of the first insulating layer, depositing a write shield on a portion of the second insulating layer, and depositing a write return yoke on at least a portion of the write yoke and on at least a portion of the write shield.

In various embodiments, the method for manufacturing the write head further comprises the formation of a read head.

In other various embodiments, the method for manufacturing a write head further comprises the steps of depositing a seed layer after the step of deposition of the spacer layer, and defining said seed layer to form a shunt.

In various embodiments, the method for manufacturing a write head further comprises the step of etching a hole in the second insulating layer connecting the pole tip and the write shield, and filling the hole with a low magnetization material for the formation of a shunt between the pole tip and the write shield.

In another general embodiment, a disk drive device comprises at least one magnetic recording medium, and at least one magnetic head supported for perpendicular recording on the at least one magnetic recording medium. In such an embodiment, each magnetic head may comprise a write shield, a write return yoke connected to the write shield, a write yoke connected to the write return yoke, conductive coils surrounding the write yoke for inducing a magnetic field in the write yoke, a write pole tip, and a spacer connecting the write pole tip to the write yoke. In some embodiments, the magnetic head of the disk drive device further comprises a shunt connecting the write pole tip and the write shield for providing a magnetic flux path between the write pole tip and the write shield.

In yet another general embodiment, a disk drive device comprises at least one magnetic recording medium, and at least one magnetic head supported for perpendicular recording on the at least one magnetic recording medium. In such an embodiment, each magnetic head may comprise a write shield, a write return yoke connected to the write shield, a write yoke connected to the write return yoke, conductive coils surrounding the write yoke for inducing a magnetic field in the write yoke, a write pole tip, and a shunt connecting the write pole tip and the write shield for providing a magnetic flux path between the write pole tip and the write shield.

DETAILED DESCRIPTION OF PREFERRED EMBODIMENTS

Reference will now be made to the accompanying drawings, which assist in illustrating the various pertinent features of the present invention. Although the present invention will now be described primarily in conjunction with disk drives, it should be expressly understood that the present invention may be applicable to other applications where magnetic recording of data is required/desired. In this regard, the following description of a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application(s) or use(s) of the present invention.

The present invention relates to write head designs which utilizes a non-magnetic spacer or a saturable magnetic shunt to reduce or eliminate the effects of remnant magnetic fields which cause pole tip erasures (PE). Such a write head is used in the read/write head of a disk drive 10.

Figure 1:
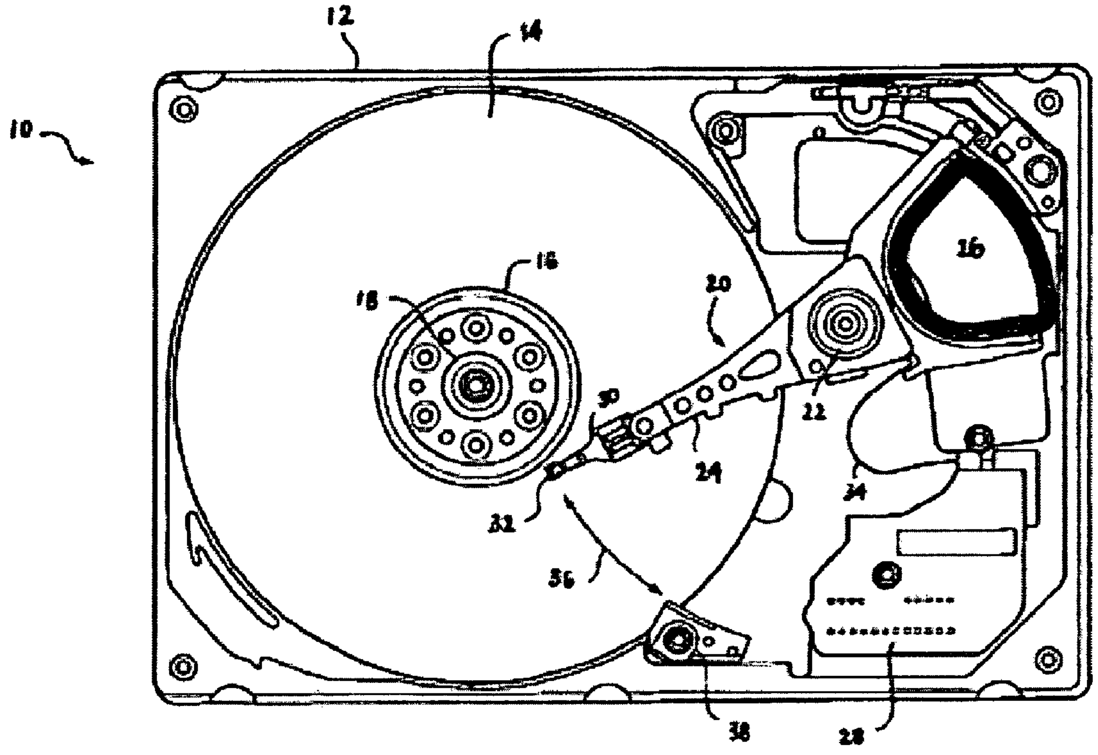
FIG. 1 illustrates a simplified top view of a disk drive.

FIG. 1 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read sensor technologies such as anisotropic magnetoresistive (AMR), giant magnetoresistive (GMR), tunneling magnetoresistive (TuMR), other magnetoresistive technologies, or other suitable technologies. AMR is due to the anisotropic magnetoresistive effect with a normalized change in resistance (ΔR/R) of 2-4%. GMR results from spin-dependent scattering mechanisms between two (or more) magnetic layers. The typical use in recording heads is the spin valve device that uses a pinned magnetic layer and a free layer to detect external fields. The normalized change in resistance is typically 8-12%, but can be as large as 15-20% when used with specular capping layers and spin-filter layers. TuMR is similar to GMR, but is due to spin dependent tunneling currents across an isolation layer. The typical embodiment includes a free layer and a pinned layer separated by a insulating layer of $Al_2O_3$ with the current flowing perpendicular to the film plane, producing normalized change in resistance of 12-25%. The term magnetoresistive is used in this application to refer to all these types of magnetoresistive sensors and any others in which a variation in resistance of the sensor due to the application of an external magnetic field is detected. The write transducer technology of the head of the present invention is discussed in further detail below.

The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path 36 and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or "landing" on its corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

Figure 2:
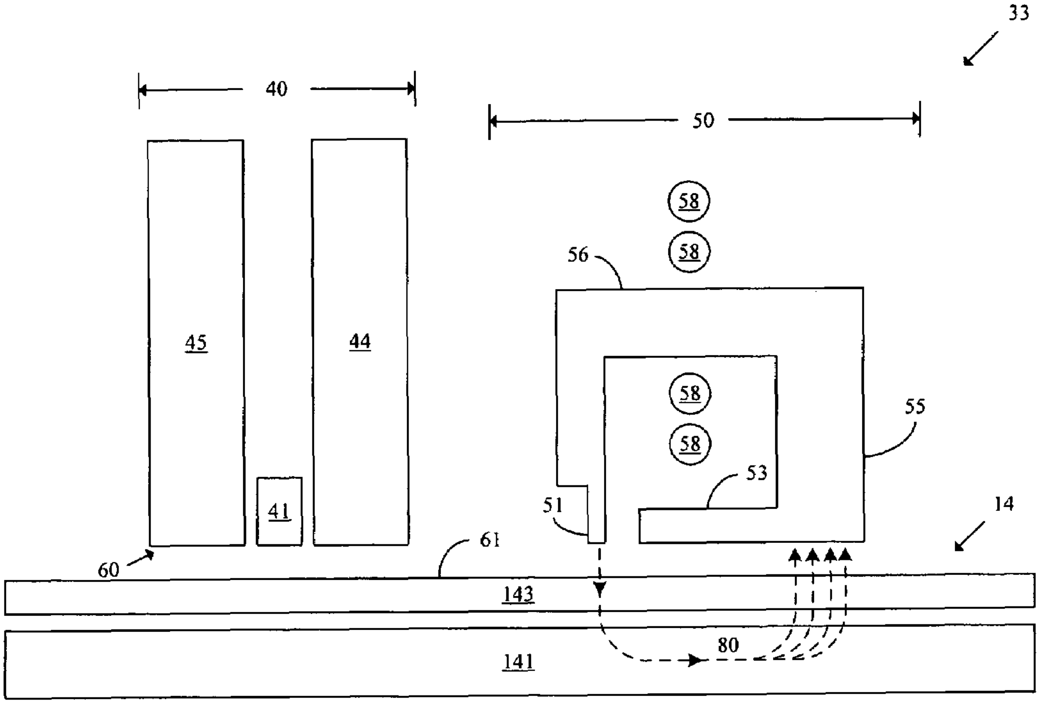
FIG. 2 (Prior Art)
FIG. 2 illustrates a prior art design of a read/write head.

FIG. 2 illustrates a typical prior art design of a head 33 that may be mounted on a slider 32 (refer to FIG. 1). The head 33 comprises a read head 40 and a write head 50. The read head 40 typically comprises a read sensor 41, and read shields 44 and 45. The write head 50 typically comprises a pole tip 51, a write yoke 56, a write return yoke 55, and a write shield 53. Furthermore, the write head 50 comprises conductive coils 58 surrounding the write yoke 56 for the generation of a magnetic field. When an electric current is passed through the conductive coils 58, the current generates a magnetic field in the write yoke 56, which causes the pole tip 51 to become magnetized. FIG. 2 illustrates the state of the head 33 while the disk drive 10 (refer to FIG. 1) is in operation. During a write or a read operation, the head 33 is positioned in close proximity to the disk 14, separated by an air bearing formed adjacent a surface of the disk 14 that faces the head 33 (hereinafter, the air-bearing-surface (ABS) 61 of the disk 14). An air bearing surface (ABS) 60 of the head 33 flies on an air bearing formed by the spinning of the disk 14'. The disk 14 comprises a soft underlayer (SUL) 141 supporting a magnetic storage layer 143, where the SUL 141 and the storage layer 143 may be separated in various embodiments by a non-magnetic spacer layer (not shown).

In the typical prior art design as shown in FIG. 2, the conductive coils 58 are composed of a material with low electrical resistance, such as copper, or the like. The pole tip 51, write yoke 56, write return yoke 55, and write shield 53 are all composed of soft ferromagnetic materials, such as NiFe, or the like, and are all magnetically connected to each other. (The term "soft" describes the magnetic, not physical, property of the material.) Hence, in the situation where there is a remnant magnetic field in the write yoke 56, the pole tip 51 would also become magnetized.

During a write operation of the disk drive 10 (refer to FIG. 1), the slider 32 moves to a position where the head 33 is positioned directly above the region of the disk 14 corresponding to a bit of data, where the write head 50 and the disk 14 are separated by an air-bearing. A current flows through the conductive coils 58 of the write head 50 generating a magnetic field in the write yoke 56. The magnetization in the write yoke 56 causes the pole tip 51 to become magnetized. The SUL 141 is typically composed of a magnetically soft material with higher magnetic permeability compared to the material of the magnetic storage layer 143. As a result of the higher permeability of the SUL 141, the magnetic flux 80 from the pole tip 51 passes vertically through the magnetic storage layer 143 to the SUL 141. The magnetic flux 80 then passes through the SUL 141 and returns to the write return yoke 55 (return path). Because the tip area of the pole tip 51 is small, the magnetic flux 80 density is high in the region of the magnetic storage layer 143 positioned immediately under the pole tip 51; hence, the magnetic flux 80 is capable of causing a change of the storage state of a bit of data. By comparison, because the write return yoke 55 is wider in surface area, the magnetic flux density on the return path is lower since it is distributed over a wider area, therefore the storage state of the magnetic storage layer 143 on the return path remains unchanged.

Figure 3:
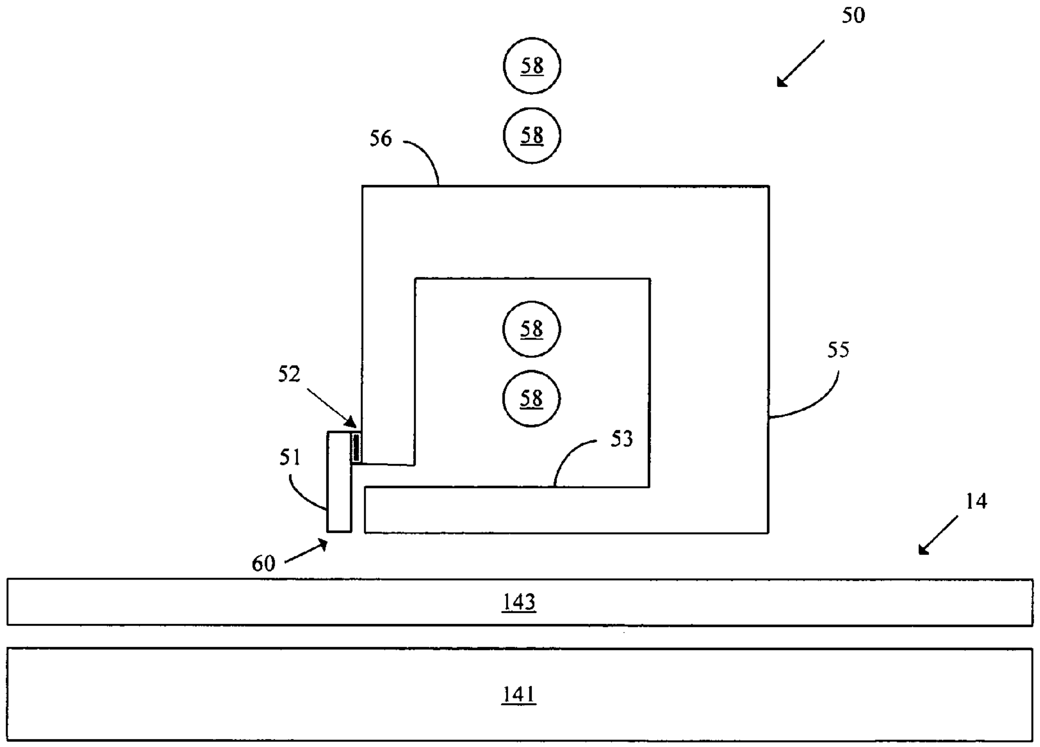
FIG. 3 illustrates a write head with a non-magnetic spacer according to an embodiment of the present invention.

FIG. 3 illustrates an embodiment of the present invention where a non-magnetic spacer 52 is inserted between the pole tip 51 and the write yoke 56. The non-magnetic spacer 52 is composed of a non-magnetic material. Preferably, the material for the non-magnetic spacer 52 should also have good thermal conductivity. One possible material is copper; however, other materials that meet the criteria discussed above can also be used. Suitable materials for the non-magnetic spacer 52 further include alumina ($Al_2O_3$), non-magnetic nickel-phosphorous, gold, tantalum, tantalum-oxide, and the like.

In the embodiment of the present invention illustrated by FIG. 3, the pole tip 51 is magnetically separated from the write yoke 56 by the non-magnetic spacer 52. Hence, in the situation where a remnant magnetic field remains in the write yoke 56, it becomes less likely that the pole tip 51 would become magnetized due to the magnetic impedance of the non-magnetic spacer 52. However, because the thickness of the non-magnetic spacer 52 is relatively thin, when the magnetization in the write yoke 56 is high from a current flowing through the conductive coils 58, the magnetic field of the write yoke 56 could overcome the magnetic impedance of the non-magnetic spacer 52, and the write yoke 56 could still magnetize the pole tip 51. Therefore, the structure illustrated in FIG. 3 is less likely to cause pole tip erasure when there is no current in the conductive coils 58 because the non-magnetic spacer 52 prevents the pole tip 51 from getting magnetized by remnant magnetic fields from the write yoke 56, while still allowing for performing write operations when the write yoke 56 is highly magnetized.

Figure 11:
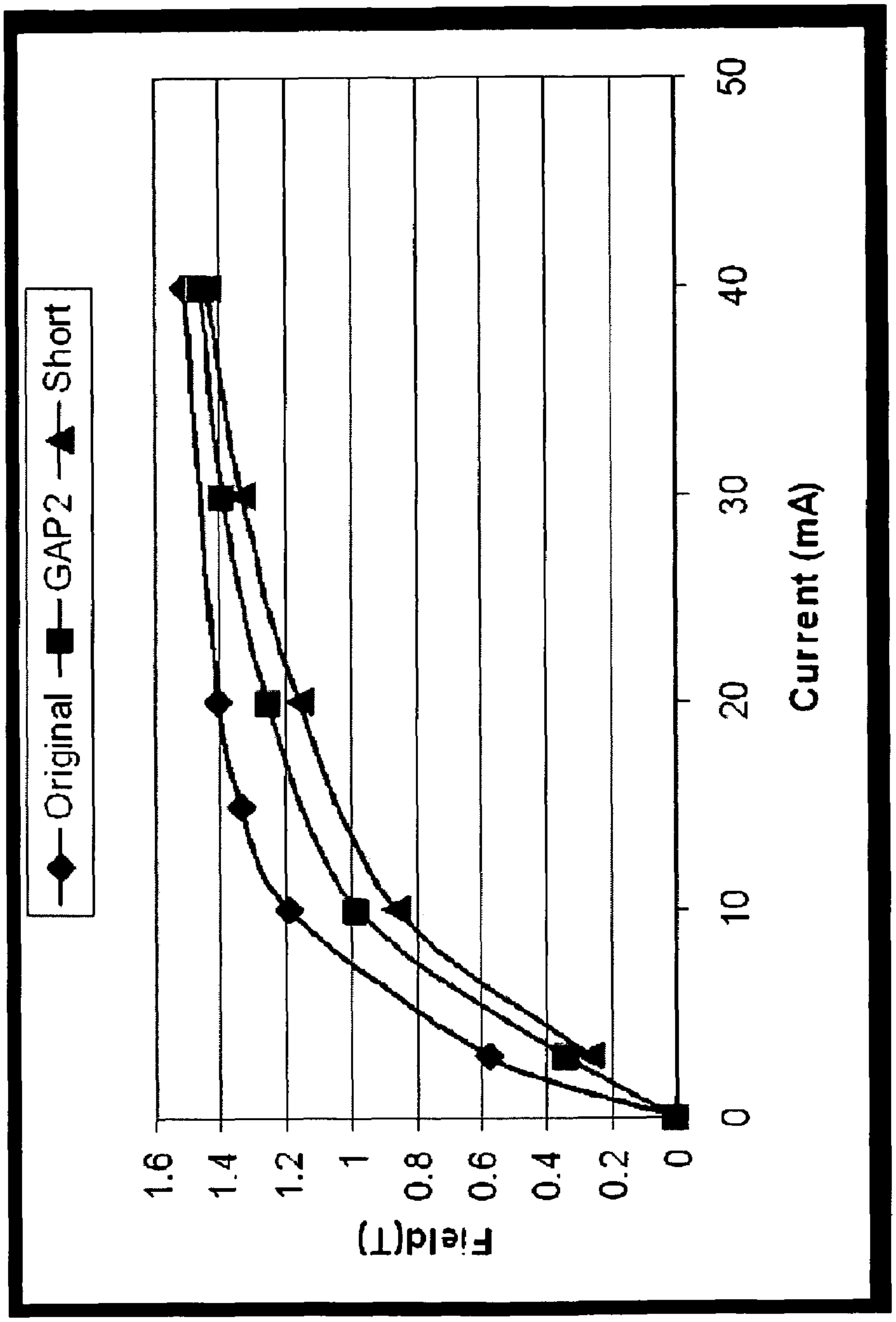
FIG. 11 illustrates simulated performance results of a write head with a non-magnetic spacer (line labeled "GAP2"), a write head with a saturable yoke shunt (line labeled "Short"), compared to a performance of a prior art write head design (line labeled "Original"), where the x-axis represents a current through magnetic coils, and the y-axis represents a resulting magnetic field in the write pole tip.

FIG. 11 illustrates the simulation result of the magnetic field (shown on the y-axis) of the pole tip 51 in a conventional design (diamond line labeled "Original") compared with a design with a non-magnetic spacer 52 (square line labeled "GAP2"). As the graph illustrates, at low currents (shown on the x-axis) representing a remnant magnetic field in the write yoke 56 or in the pole tip 51, the magnetic field of the pole tip with a non-magnetic spacer 52 could be more than 50% reduced from that of the conventional design. However, at high currents, the magnetic field of the pole tip remains close to that of the conventional design, with little efficiency loss. It is noted that the simulation results shown in FIG. 11 are based on a DC current in the conductive coils 58, which is the worst-case scenario for efficiency loss of the write head. At a high frequency AC current, such as the case during the actual write operations of a disk drive, the efficiency loss at high currents is expected to be much less.

Furthermore, using the structure of FIG. 3, one could control the fractional reduction in erasure field by controlling the dimensions of the non-magnetic spacer 52. Typically, the impedance between the SUL 141 and the write pole tip 51 can be approximated by:

Impedance of Pole Tip to SUL~(Tip to SUL distance)/(Tip Area on ABS)

Furthermore, the impedance between the tip and the yoke can be approximated by:

Impedance of Tip to Yoke~(Thickness of non-magnetic spacer)/(overlapping area of non-magnetic spacer)

Therefore, the fractional reduction in the erasure field can be approximated from the ratio of the impedance of tip-to-yoke divided by the total impedance of tip-to-SUL plus the impedance of the tip-to-yoke.

Fractional Reduction in Erasure Field=$x/(1+x)$, where $x$=(thickness of non-magnetic spacer*Tip Area on ABS)/(Tip to SUL distance*area of spacer)

Hence, by controlling the overlapping area between the non-magnetic spacer 52 and the pole tip 51, and the thickness of the non-magnetic spacer 52, it is possible to control the fractional reduction in erasure field caused by the insertion of the non-magnetic spacer 52. A higher fractional reduction in erasure field means reduced likelihood of pole-tip erasure. However, it also means lower write efficiency for the write head (a higher current is needed for the write operation). On the other hand, a lower fractional reduction in erasure field means less protection against pole-tip erasure, but also less efficiency loss. As shown in FIG. 3, by manufacturing the non-magnetic spacer 52 perpendicular to the ABS 60 (thus parallel to the plane of a substrate in the manufacturing process), it is possible to control both the thickness of the spacer 52 and the overlapping area of spacer 52. More details of the manufacturing process are provided later while referring to FIG. 4. The perpendicular spacer design shown in FIG. 3 enables a write head design such that the magnetic impedance between the pole tip 51 and the write yoke 56 is greater than 35% of the magnetic impedance between the pole tip 51 and the SUL 141.

Figure 4:
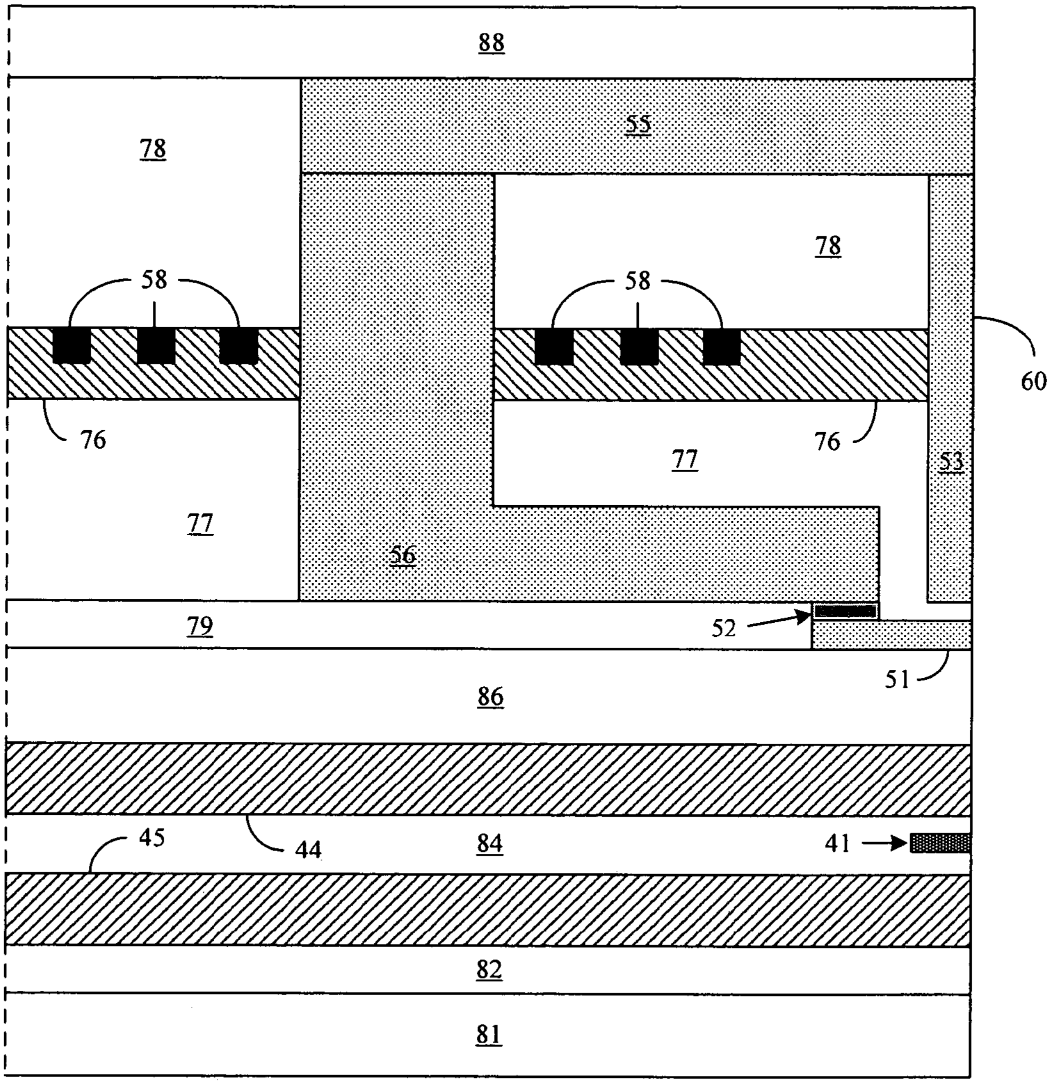
FIG. 4 illustrates a cross-sectional view of a manufacturing process for manufacturing a write head with a non-magnetic spacer in accordance with an embodiment of the present invention.

Relevant details of a process of manufacturing a write head 50 of the present invention will now be discussed in conjunction with FIG. 4. FIG. 4 is oriented such that the air-bearing surface (ABS) 60 is on the right side of the illustration. This discussion focuses on the main process steps relevant to embodiments of the present invention, and certain conventional steps such as the formation of seed layers, certain photolithography layers, chemical-mechanical polishing, layers for electrical connections, and other process steps are omitted.

As is illustrated in FIG. 4, a substrate 81 is provided. The substrate 81 may comprise, for example, AlTiC, or the like. An undercoat layer 82 is deposited on the substrate 81. The undercoat layer 82 may comprise, for example, $Al_2O_3$, or the like. A first read shield 45 is deposited on the undercoat layer 82. The first read shield 45 may comprise, for example, a ferromagnetic material, such as NiFe, or the like. A first portion of a first insulating layer 84 is deposited on the first read shield 45. The first insulating layer 84 may comprise, for example, $Al_2O_3$, or the like. The read sensor 41 is deposited on the first portion of the first insulating layer 84 and a remainder of the first insulating layer 84 is deposited over the read sensor 41. A second read shield 44 is deposited on the first insulating layer 84. The second read shield 44 may comprise, for example, a ferromagnetic material, such as NiFe, or the like. A third insulating layer 86 is deposited on the second read shield 44. The second insulating layer 86 may comprise, for example, $Al_2O_3$, or the like.

The second insulating layer 86 may act as a first layer for the write head 50 (refer to FIG. 3). The write pole tip 51 is deposited on a first portion of the second insulating layer 86. A third insulating layer 79 is deposited on a second portion of the second insulating layer 86. The third insulating layer 79 may comprise, for example, $Al_2O_3$, or the like. The non-magnetic spacer 52 is deposited on a first portion of the write pole tip 51. A first portion of the write yoke 56 is deposited on at least a portion of the non-magnetic spacer 52 and on at least a portion of the third insulating layer 79. A fourth insulating layer 77 is deposited on a portion of the write pole tip 51 and on a portion of the write yoke 56 and on a portion of the third insulating layer 79. The fourth insulating layer 77 may comprise, for example, $Al_2O_3$, or the like.

A photoresist layer 76 with an arrangement of the conductive coils 58 is deposited on the fourth insulating layer 77. A fifth insulating layer 78 is deposited on the photoresist layer 76. The fifth insulating layer 78 may comprise, for example, $Al_2O_3$, or the like. At this point, a first etching process removes a first portion of the fifth insulating layer 78, a first portion of the photoresist layer 76, and a first portion of the fourth insulating layer 77, exposing a particular portion of the write yoke 56. A remaining portion of the write yoke 56 is then deposited on the particular portion of the write yoke 56 in the area that was defined by the first etching process. Also, a second etching process removes a second portion of the fifth insulating layer 78, a second portion of the photoresist layer 76, and a second portion of the fourth insulating layer 77. The write shield 53 is deposited on a particular portion of the fourth insulating layer 77 in the area defined by the second etching process. The write return yoke 55 is deposited on a portion of the write yoke 56 and on a portion of the write shield 53 and on a portion of the fifth insulating layer 78. Then, an overcoat layer 88 is deposited on a portion of the fifth insulating layer 78 and on the write return yoke 55. The overcoat layer 88 may comprise, for example, $Al_2O_3$, or the like.

Hence, the resulting structure is a write head 50 with a non-magnetic spacer 52 between the pole tip 51 and the write yoke 56, manufactured using a conventional manufacturing process. In addition, because the non-magnetic spacer 52 is deposited parallel to the substrate 81 in the manufacturing process (and thus perpendicular to the ABS 60), a thickness of the non-magnetic spacer 52 can be easily controlled in the manufacturing process. To save cost and reduce manufacturing complexity, the write head 50 and the read head 40 are typically manufactured together on the same substrate. The manufacturing process described above is compatible with such an arrangement. In various other embodiments, the read head 40 and the write head 50 may be manufactured separately.

Figure 5:
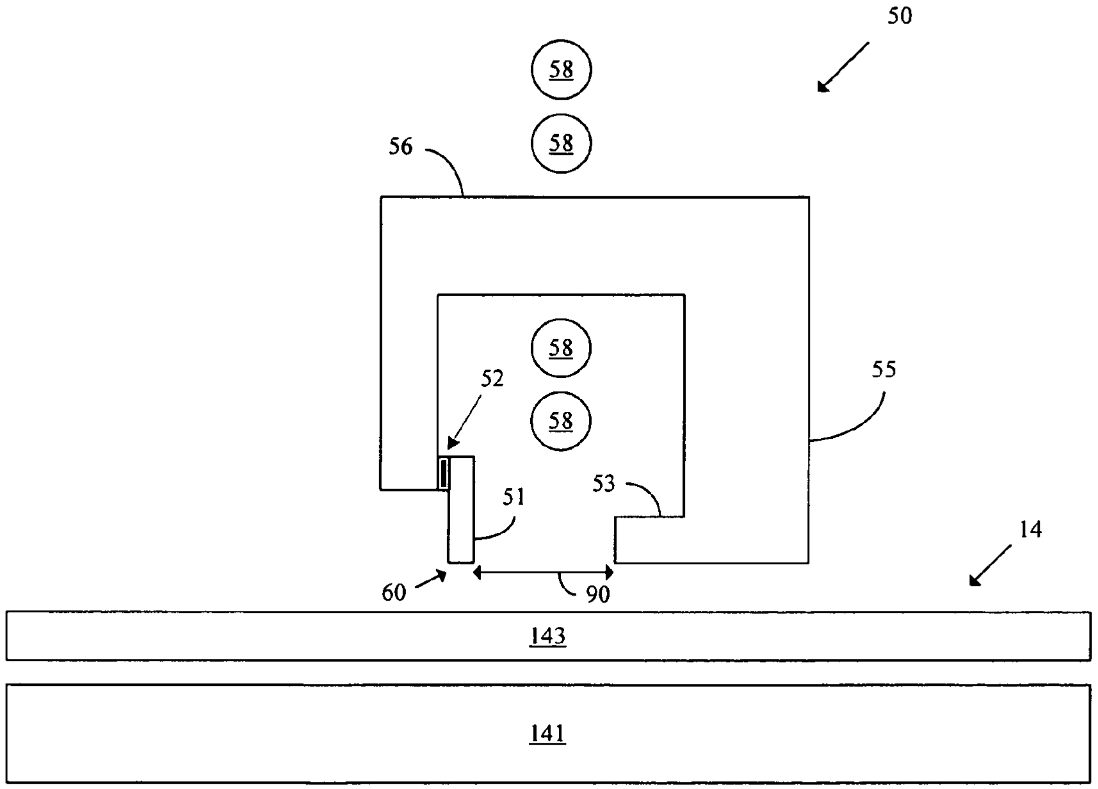
FIG. 5 illustrates a write head with a non-magnetic spacer according to an embodiment of the present invention.

FIG. 5 illustrates the disk 14 and the write head 50 with the non-magnetic spacer 52 in accordance with another embodiment of the present invention. The write head 50 of FIG. 5 differs from the write head 50 of FIG. 3 in that the non-magnetic spacer 52 in the write head 50 of FIG. 5 is located at least partially between a portion of the write yoke 56 and a portion of the write return yoke 55. Also, at least a portion of the write pole tip 51 in the write head 50 of FIG. 5 is located at least partially between a portion of the non-magnetic spacer 52 and a portion of the write return yoke 55. As is illustrated in FIG. 5, in various different embodiments, a gap 90 between the write pole tip 51 and the write shield 53 may be set to different distances. Also, in some embodiments, the write shield 53 may be omitted from the write head 50.

Figure 6:
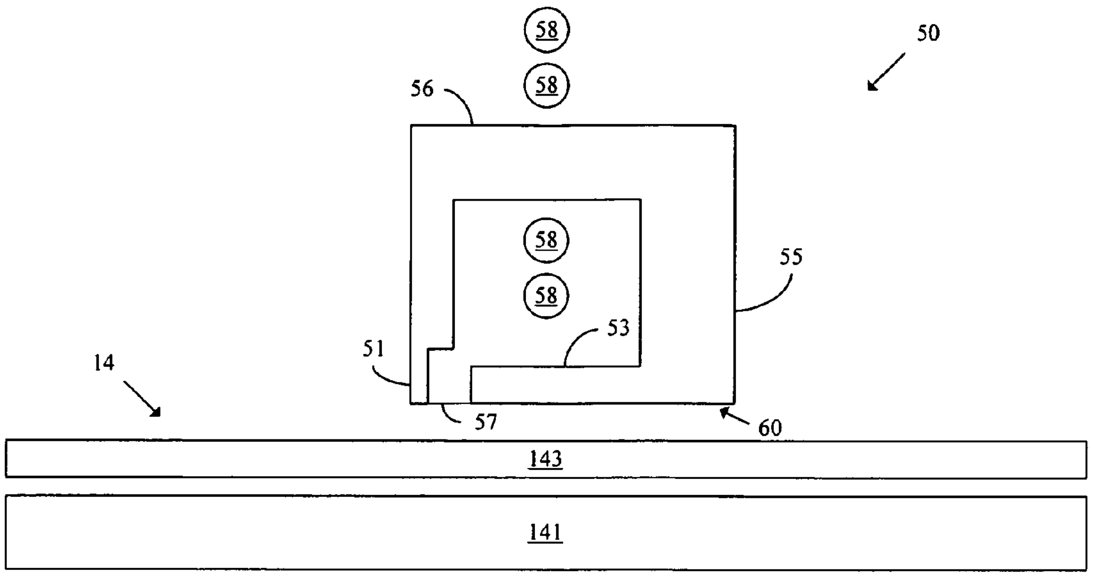
FIG. 6 illustrates a write head with a saturable yoke shunt according to an embodiment of the present invention.

FIGS. 6-10 illustrate various other embodiments of the present invention in which pole tip erasure is reduced using a saturable yoke shunt 57. FIG. 6 illustrates a write head 50 according to an embodiment of the present invention. In this embodiment, the write head 50 comprises a write pole tip 51, write yoke 56, write return yoke 55, write shield 53, conductive coils 58, and a saturable yoke shunt 57 connecting the pole tip 51 and the write shield 53. The material for the saturable yoke shunt 57 is preferably a material with low saturation magnetization (Ms), such as Ni—P, or the like. The saturable yoke shunt 57 provides a path for directing a limited amount of magnetic flux from the pole tip 51 to the return path (the write shield 53). In cases where the pole tip 51 remains magnetized with a remnant field, the magnetic flux is shunted to the write shield 53, instead of being passed to the disk 14 to cause pole tip erasure (PE). However, while the write head 50 is in operation and there is a current flowing through the conductive coils 58 causing a strong magnetic field in the pole tip 51, the saturable yoke shunt 57 becomes saturated such that only a limited amount of magnetic flux can be shunted to the write shield 53, and the majority of the magnetic flux passes to the disk 14 to achieve the desired write operation.

FIG. 11 compares the magnetic field (shown on the y-axis) of a pole tip 51 in a conventional design (diamond line labeled “Original”) and a pole tip 51 with a saturable yoke shunt 57 (triangle line labeled “Short”). As shown in FIG. 11, at low currents (corresponding to the presence of a small remnant magnetic field), the magnetic field of the pole tip 51 is reduced by more than 50% when using a saturable yoke shunt 57 compared to a conventional design. However, at high currents, the shunt becomes saturated such the efficiency loss associated with the use of the shunt 57 is relatively small.

Figure 7:
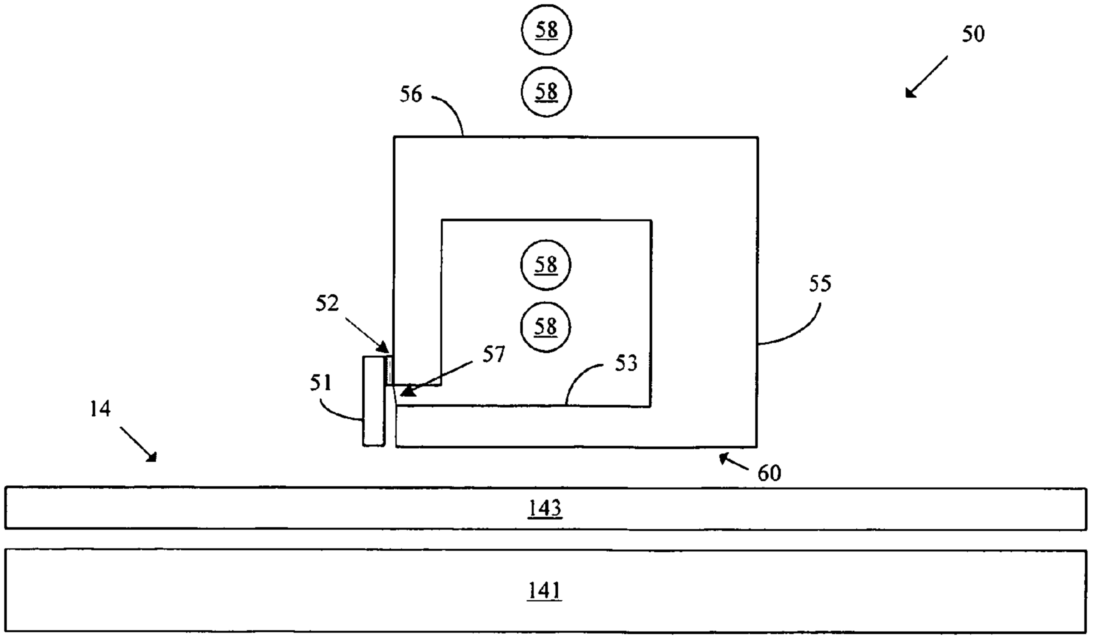
FIG. 7 illustrates a write head with a non-magnetic spacer and a saturable yoke shunt according to yet another embodiment of the present invention.

FIG. 7 illustrates yet another embodiment of the present invention. The write head 50 illustrated in FIG. 7 comprises both a non-magnetic spacer 52 and a saturable yoke shunt 57. In this embodiment, the pole tip 51 enjoys protection against pole tip erasure from both the non-magnetic spacer 52 and the saturable yoke shunt 57.

Figure 8:
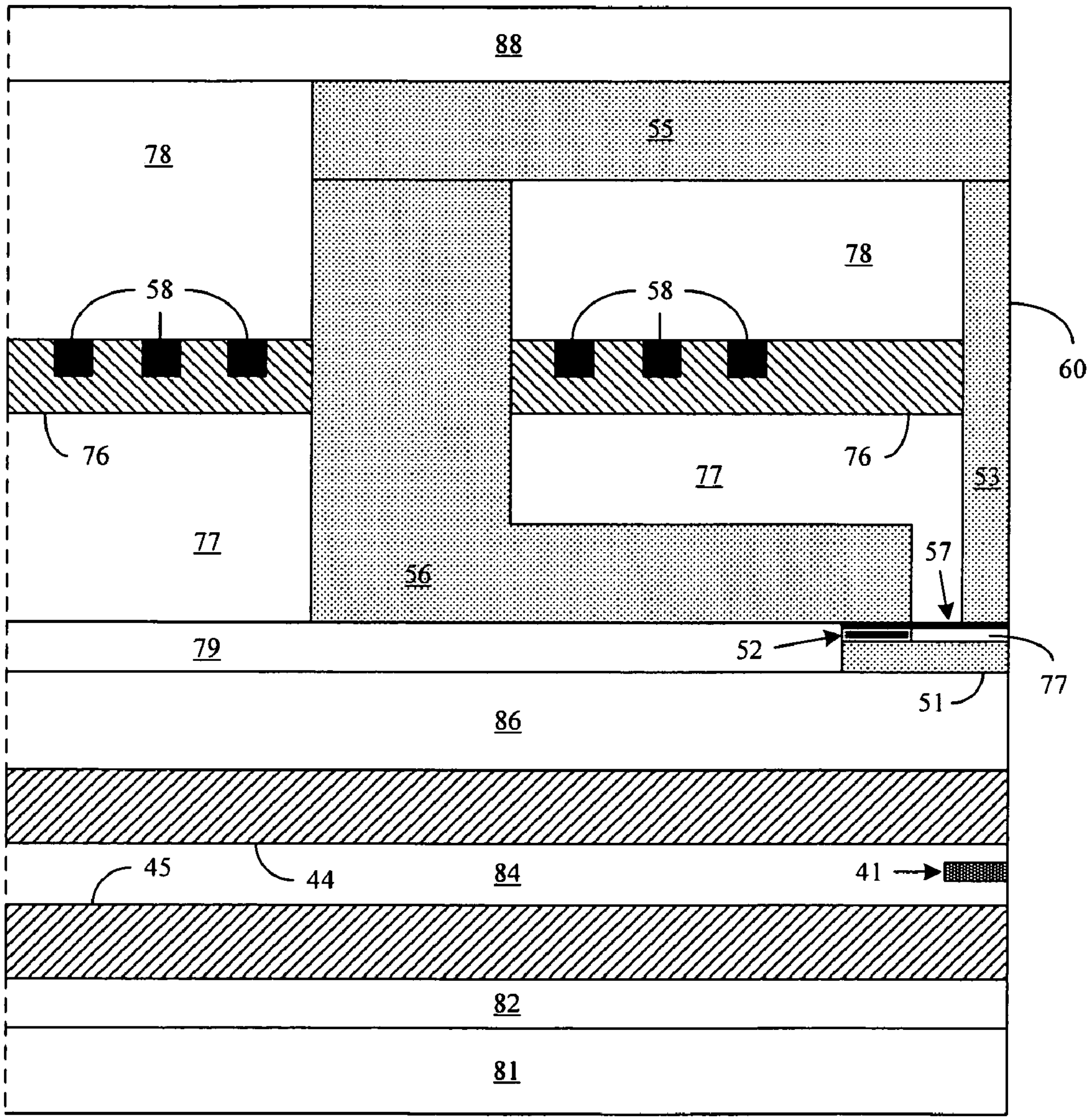
FIG. 8 illustrates a cross-sectional view of a manufacturing process for manufacturing a write head with a saturable yoke shunt that is oriented substantially perpendicular to an air-bearing-surface (ABS) in accordance with an embodiment of the present invention.
Figure 9:
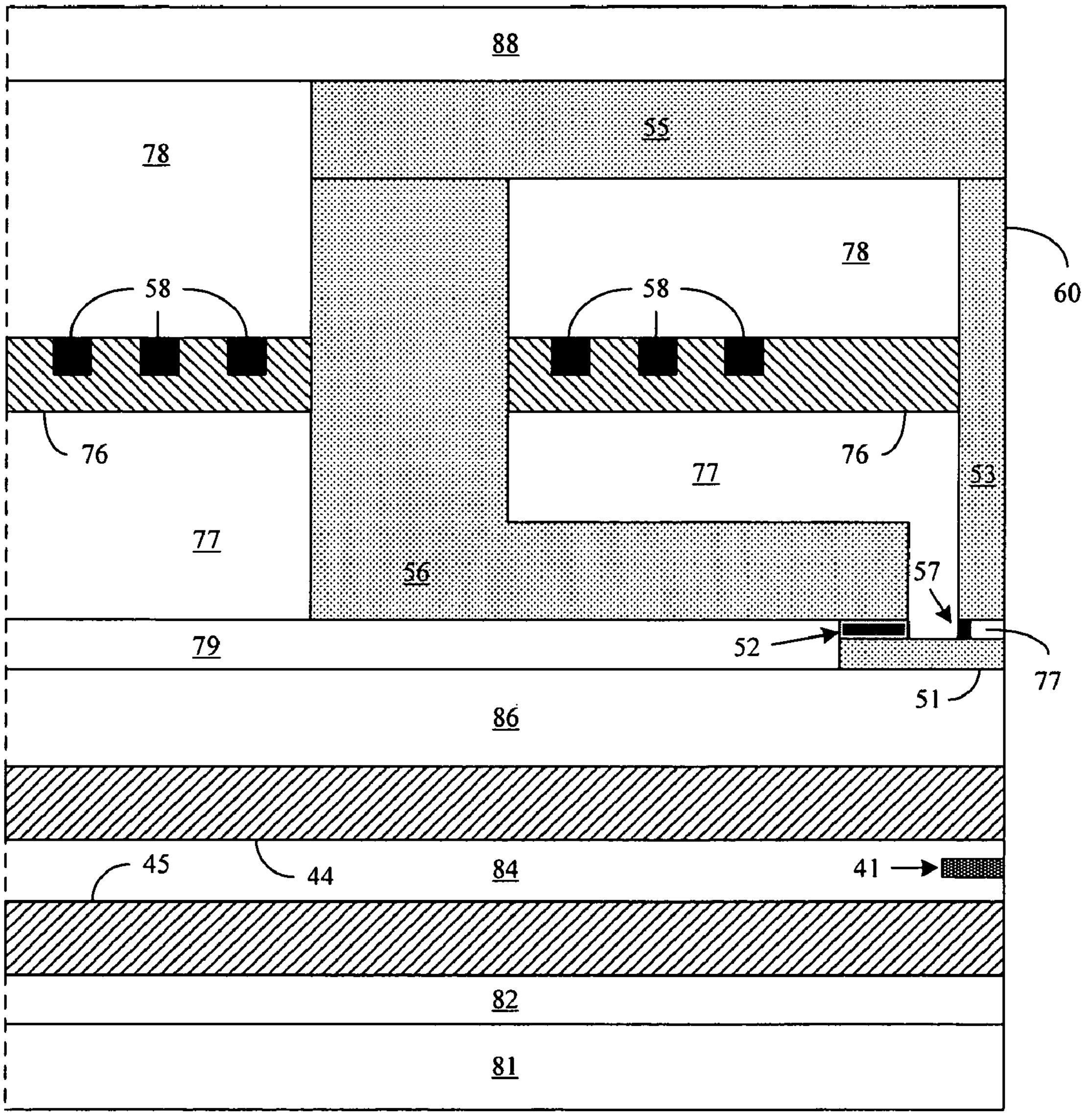
FIG. 9 illustrates a cross-sectional view of a manufacturing process for manufacturing a write head with a saturable yoke shunt that is oriented substantially parallel to an air-bearing-surface (ABS) in accordance with an embodiment of the present invention.

FIGS. 8 and 9 illustrate two possible methods of manufacturing the saturable yoke shunt 57. The process steps that were already discussed while referring to FIG. 4 are omitted here. In both FIGS. 8 and 9, the air-bearing-surface (ABS) 60 is on the right edge of the illustrations. FIG. 8 illustrates one embodiment of the present invention in which the saturable yoke shunt 57 is manufactured substantially perpendicular to the ABS 60, and substantially parallel to the substrate 81. In this embodiment, the write pole tip 51 is deposited and encapsulated with $Al_2O_3$, or the like, and then is planarized with a chemo-mechanical lapping (CMP). After that, a portion of the fourth insulating layer 77 is deposited, a magnetic seed for the write yoke 56 is deposited, and the write yoke 56 is platted. Then, the seed is masked in a shunt region and is ion milled to leave the saturable yoke shunt 57. Finally, the rest of the structure is completed (coils and write shield deposition) as explained above with reference to FIG. 4.

FIG. 9 illustrates another embodiment of the present invention in which the saturable yoke shunt 57 is manufactured substantially parallel to the ABS 60, and substantially perpendicular to the substrate 81. After the formation of the pole tip 51 and the deposition of a portion of the fourth insulating layer 77, a photolithography step is utilized to expose an opening in the portion of the fourth insulating layer 77. The material in the fourth insulating layer 77 defined by the opening is then removed using an etch step or an ion milling step to form a pin-hole. The pin-hole is then filled with a low saturation magnetization (Ms) material, so as to create the saturable yoke shunt 57.

Figure 10:
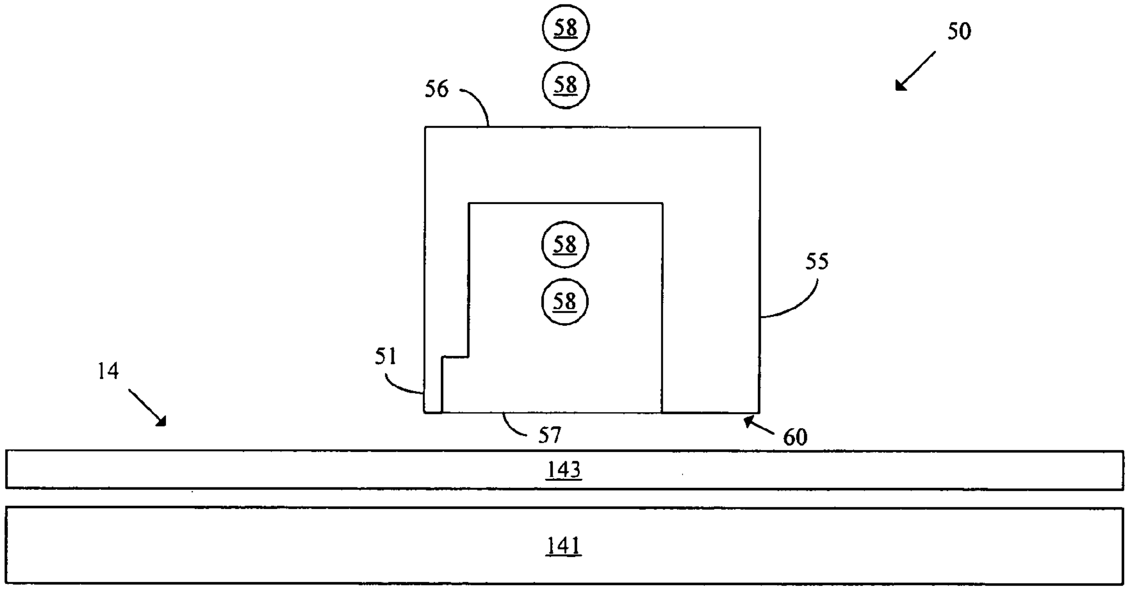
FIG. 10 illustrates a write head with a saturable yoke shunt according to an embodiment of the present invention.

FIG. 10 illustrates yet another embodiment of the present invention in which the write head 50 does not have a write shield 53 and the saturable yoke shunt connects the pole tip 51 and the write return yoke 55.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A write head for a disk drive, comprising:

a write return yoke;

a write yoke connected to the write return yoke;

conductive coils surrounding the write yoke for inducing a magnetic field in the write yoke;

a write pole tip;

a spacer connecting the write pole tip to the write yoke;

a write shield connected to the write return yoke; and a shunt connecting the write pole tip to the write shield for providing a magnetic flux path between the write pole tip and the write shield.

2. The write head of claim 1, wherein the spacer is composed of a non-magnetic material.

3. The write head of claim 2, wherein the write yoke, the write return yoke, and the write pole tip are each composed of a soft ferromagnetic material.

4. The write head of claim 2, wherein the material for the spacer is thermally conductive.

5. The write head of claim 2, wherein the spacer is composed of copper.

6. The write head of claim 1, wherein the spacer is oriented substantially perpendicular to an air-bearing-surface of a disk of the disk drive when the write head is positioned above the disk during a write operation.

7. The write head of claim 1, wherein the spacer is oriented substantially parallel to a length direction of the write pole tip.

8. The write head of claim 1, wherein the shunt is composed of a low saturation magnetization (Ms) material.

9. The write head of claim 1, wherein the shunt is capable of directing a limited amount of magnetic flux between the write pole tip and the write shield such that:

when the write pole tip is at a low magnetization state, all magnetic flux from the write pole tip is directed to the write shield via the shunt; and when the write pole tip is at a high magnetization state, the shunt is saturated and only the limited amount of magnetic flux is directed from the write pole tip to the write shield.

10. The write head of claim 1, wherein the shunt is oriented substantially perpendicular to an air-bearing-surface of a disk of the disk drive when the write head is positioned above the disk during a write operation.

11. The write head of claim 1, wherein the shunt is oriented substantially parallel to an air-bearing-surface of a disk of the disk drive when the write head is positioned above the disk during a write operation.

12. A write head for a disk drive, comprising:

a write shield;

a write return yoke connected to the write shield;

a write yoke connected to the write return yoke;

conductive coils surrounding the write yoke for inducing a magnetic field in the write yoke;

a write pole tip;

a nonmagnetic spacer connecting the write pole tip to the write yoke and having a perpendicular length less than a longest perpendicular length of the write yoke; and a shunt connecting the write pole tip and the write shield for providing a magnetic flux path between the write pole tip and the write shield.

13. The write head of claim 12, wherein the shunt is composed of a low saturation magnetization (Ms) material.

14. The write head of claim 13, wherein the write shield, the write yoke, the write return yoke, and the write pole tip are each composed of a soft ferromagnetic material.

15. The write head of claim 12, wherein the shunt is capable of directing a limited amount of magnetic flux between the write pole tip and the write shield such that:

when the write pole tip is at a low magnetization state, all magnetic flux from the write pole tip is directed to the write shield via the shunt; and when the write pole tip is at a high magnetization state, the shunt is saturated and only the limited amount of magnetic flux is directed from the write pole tip to the write shield.

16. The write head of claim 12, wherein the shunt is oriented substantially perpendicular to an air-bearing-surface of a disk of the disk drive when the write head is positioned above the disk during a write operation.

17. The write head of claim 12, wherein the shunt is oriented substantially parallel to an air-bearing-surface of a disk of the disk drive when the write head is positioned above the disk during a write operation.

18. A disk drive device, comprising:

a magnetic recording medium; and a magnetic head allowing for perpendicular recording on the magnetic recording medium;

wherein the magnetic head comprises:

a write shield;

a write return yoke connected to the write shield;

a write yoke connected to the write return yoke;

conductive coils surrounding the write yoke for inducing a magnetic field in the write yoke;

a write pole tip;

a spacer connecting the write pole tip to the write yoke; and a shunt connecting the write pole tip to the write shield for providing a magnetic flux path between the write pole tip and the write shield.

19. The disk drive device of claim 18, wherein the spacer is composed of a non-magnetic material.

20. The disk drive device of claim 19, wherein the non-magnetic material is copper.

21. The disk drive device of claim 18, wherein the spacer is oriented substantially perpendicular to an air-bearing-surface of the magnetic head.

22. The disk drive device of claim 18, wherein the spacer is oriented substantially parallel to a length direction of the write pole tip.

23. The disk drive device of claim 18, wherein the shunt is composed of a low saturation magnetization (Ms) material.

24. The disk drive device of claim 18, wherein the shunt is capable of directing a limited amount of magnetic flux between the write pole tip and the write shield such that: when the write pole tip is at a low magnetization state, all magnetic flux from the write pole tip is directed to the write shield via the shunt; and when the write pole tip is at a high magnetization state, the shunt is saturated and only the limited amount of magnetic flux is directed from the write pole tip to the write shield.

* * * * *